Feb. 28, 1967　　　　A. W. SERIO　　　3,306,648
DETACHABLE HANDLE APPARATUS
Filed March 17, 1965　　　　　　　　　7 Sheets-Sheet 1
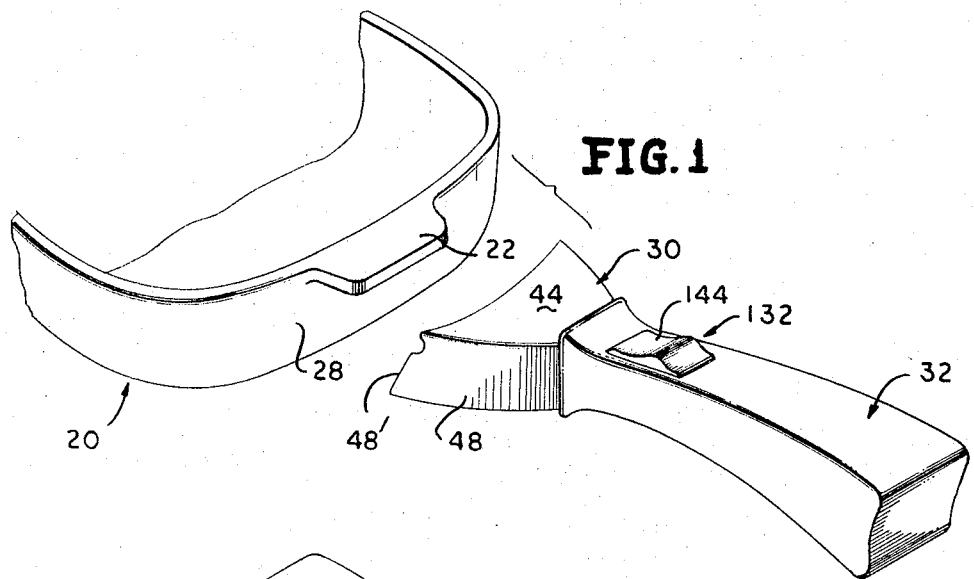
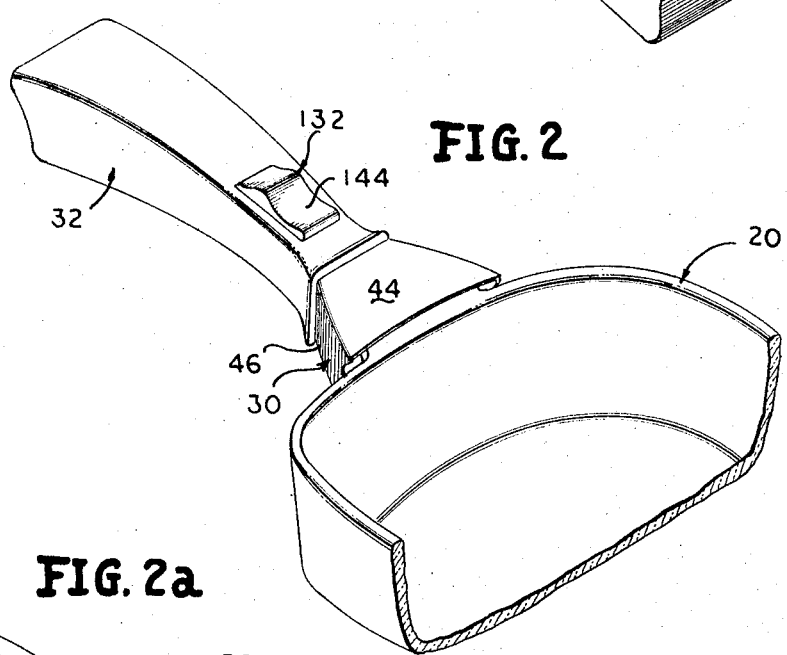
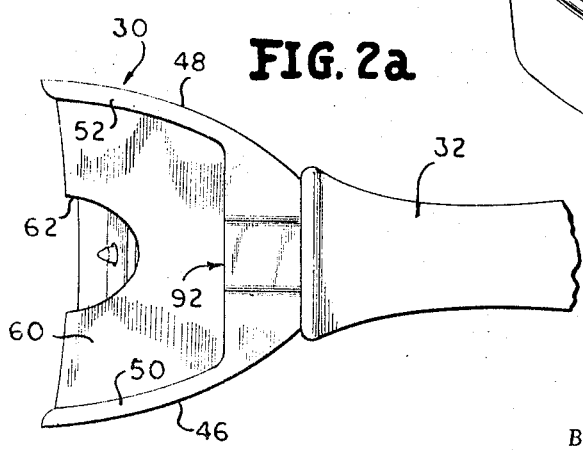
INVENTOR
ANTHONY W. SERIO
BY Shoemaker and Mattare
ATTORNEYS Feb. 28, 1967  A. W. SERIO  3,306,648
DETACHABLE HANDLE APPARATUS
Filed March 17, 1965  7 Sheets-Sheet 2
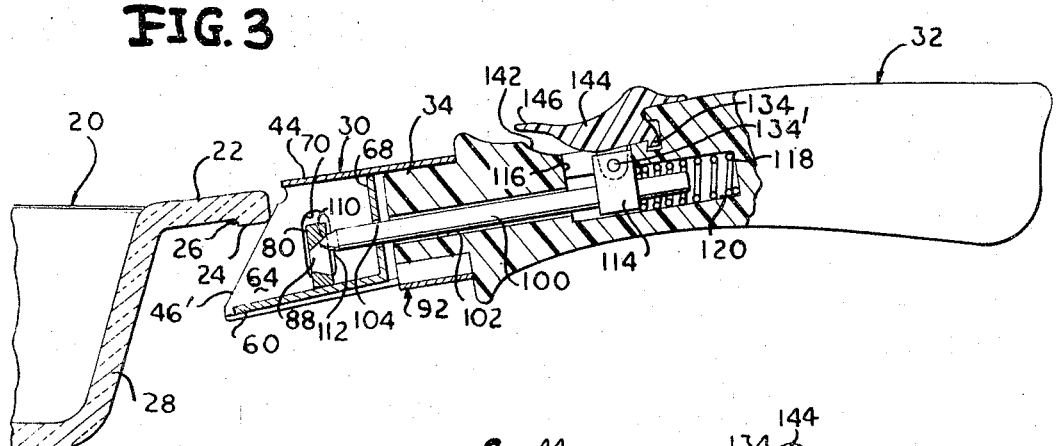
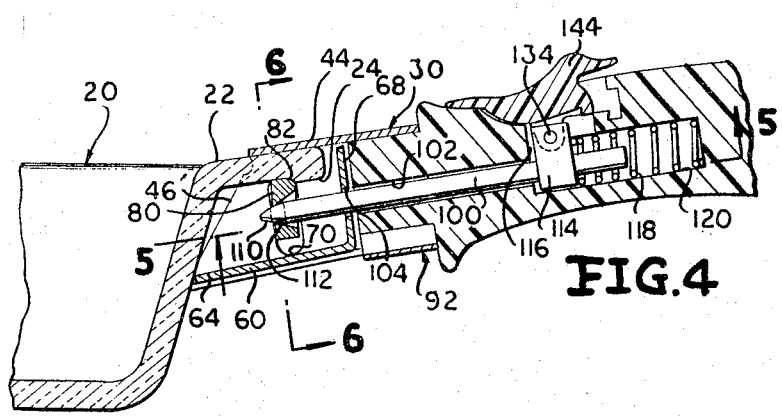
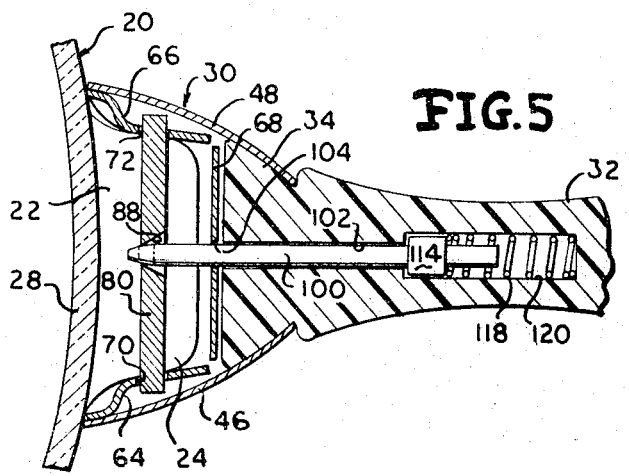
INVENTOR
ANTHONY W. SERIO
BY *Shoemaker and Mattare*
ATTORNEYS

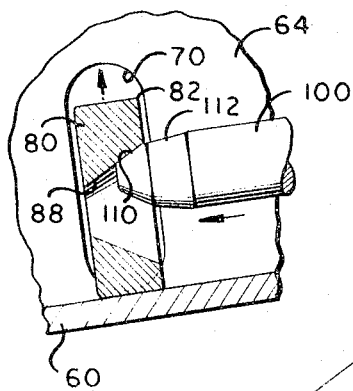
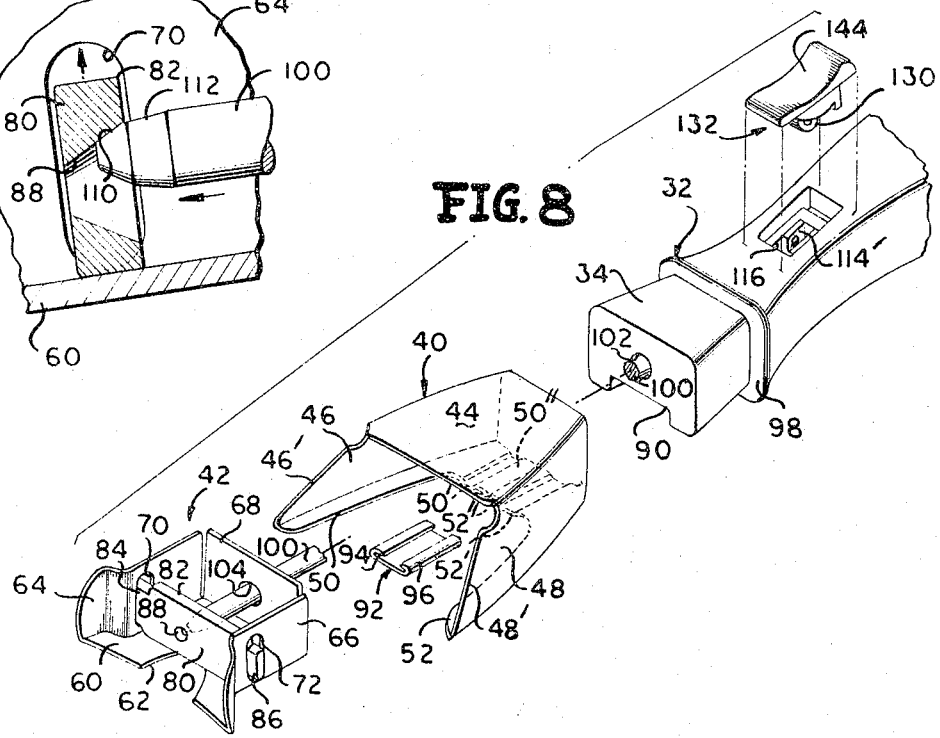
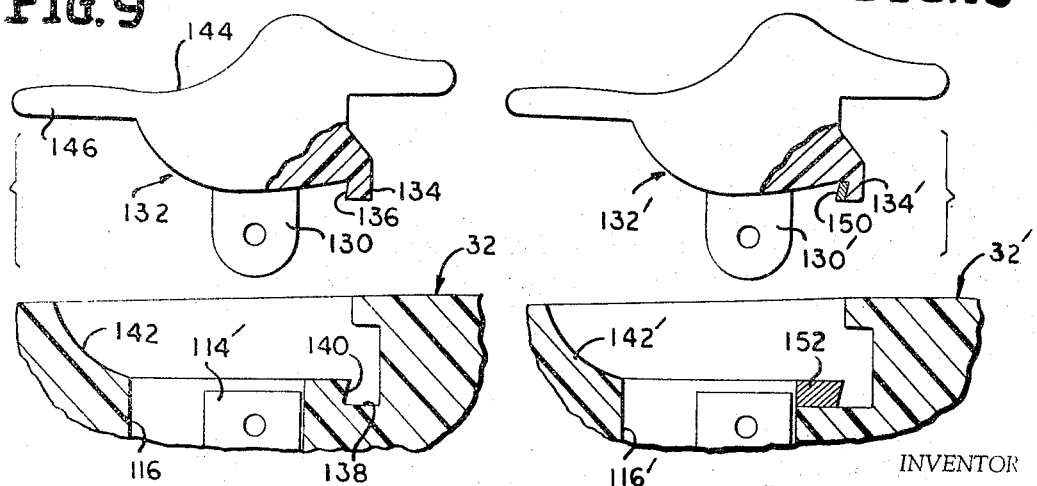

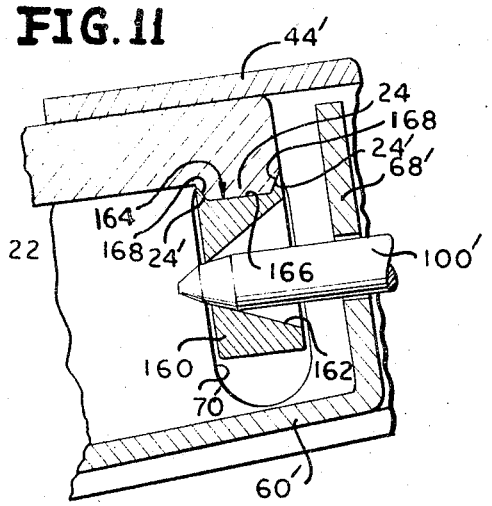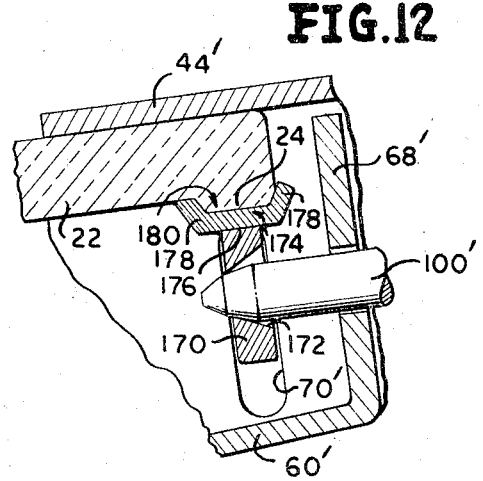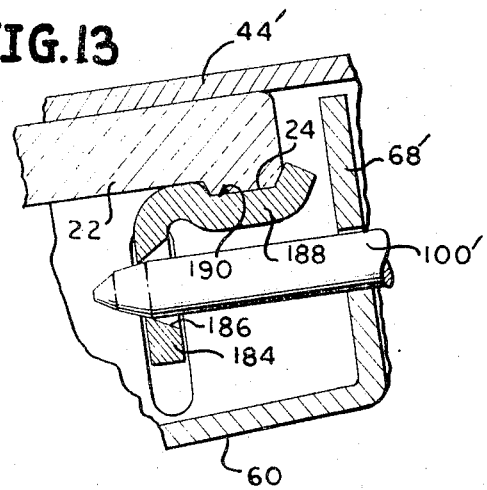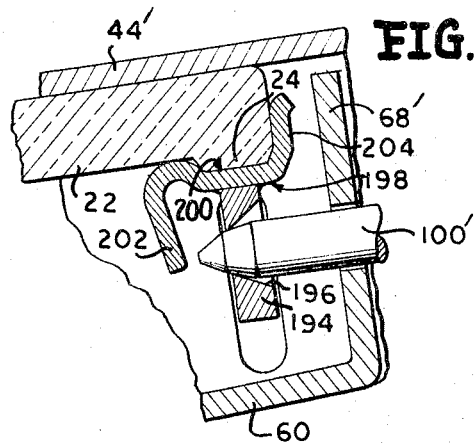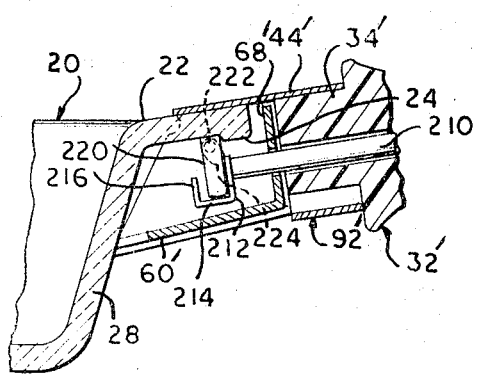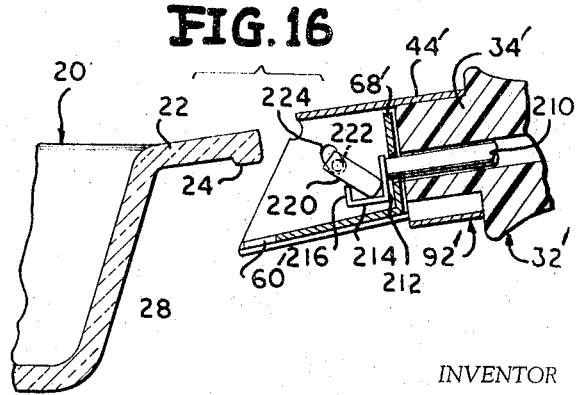

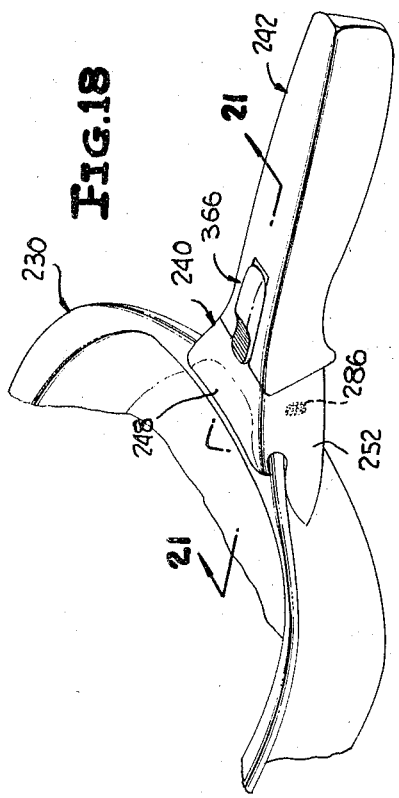
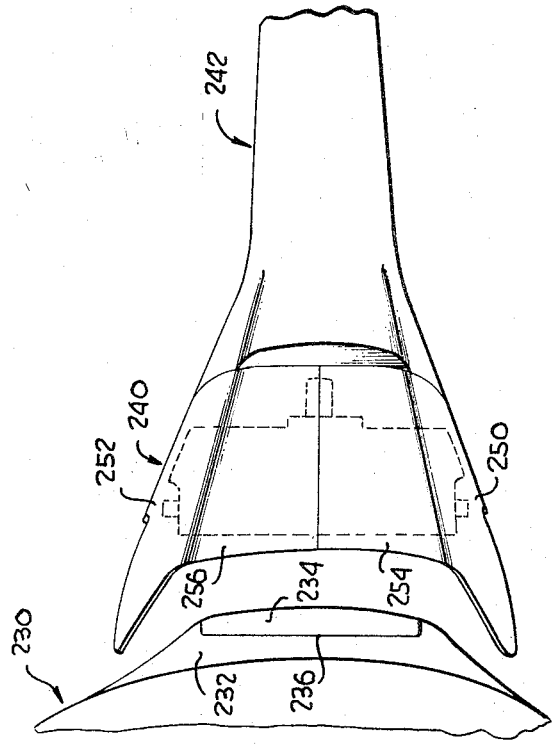
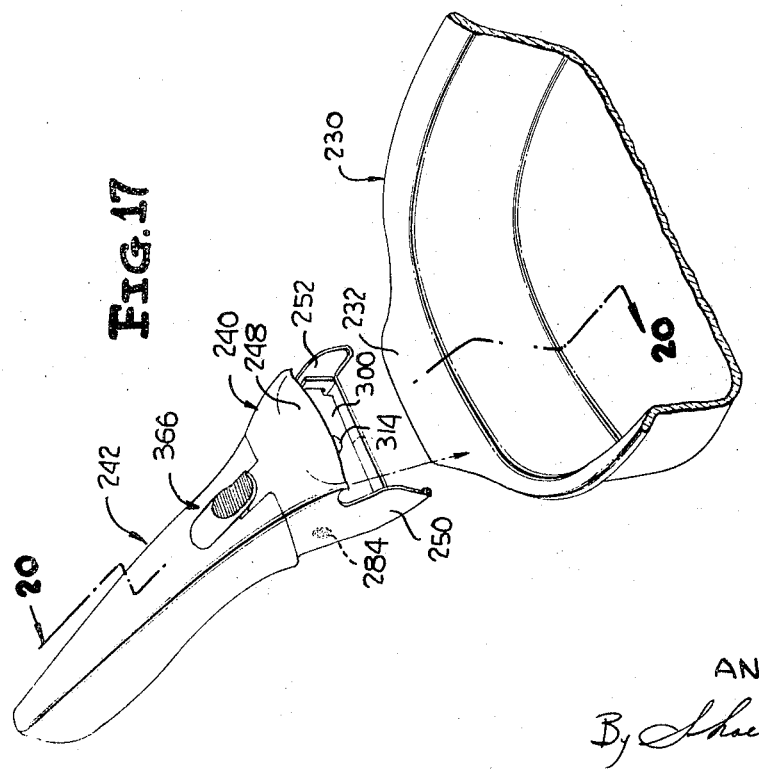

Feb. 28, 1967  A. W. SERIO  3,306,648
DETACHABLE HANDLE APPARATUS
Filed March 17, 1965  7 Sheets-Sheet 6
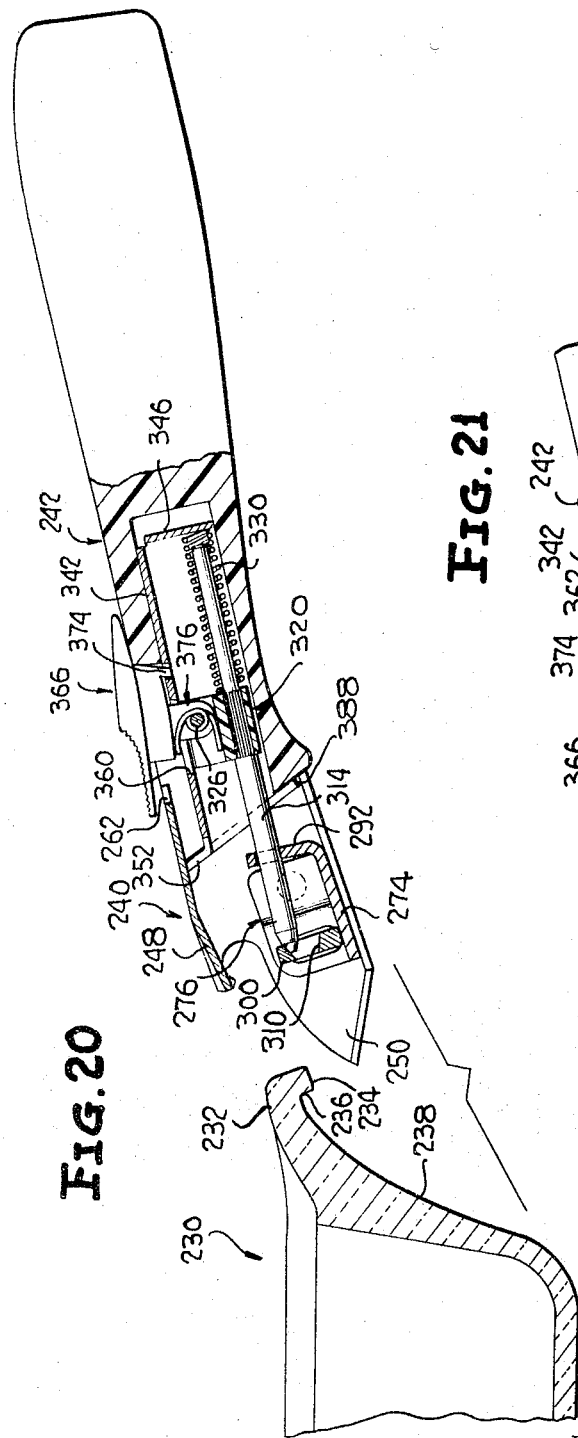
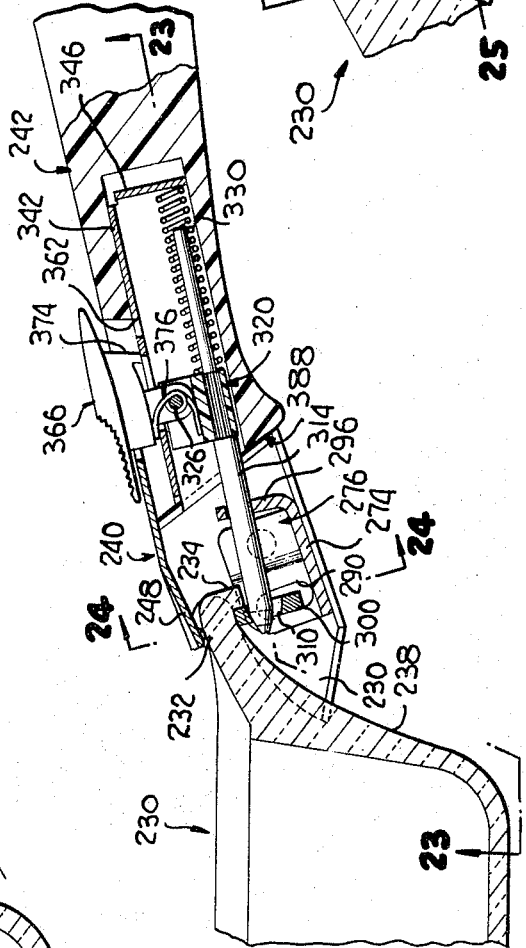
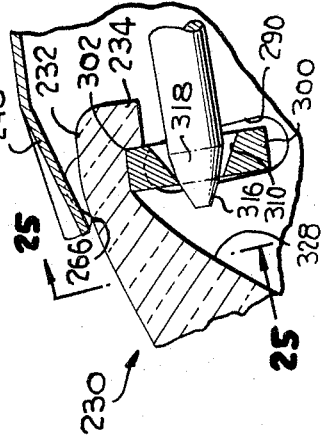
INVENTOR
ANTHONY W. SERIO
BY Shoemaker and Mattare
ATTORNEYS

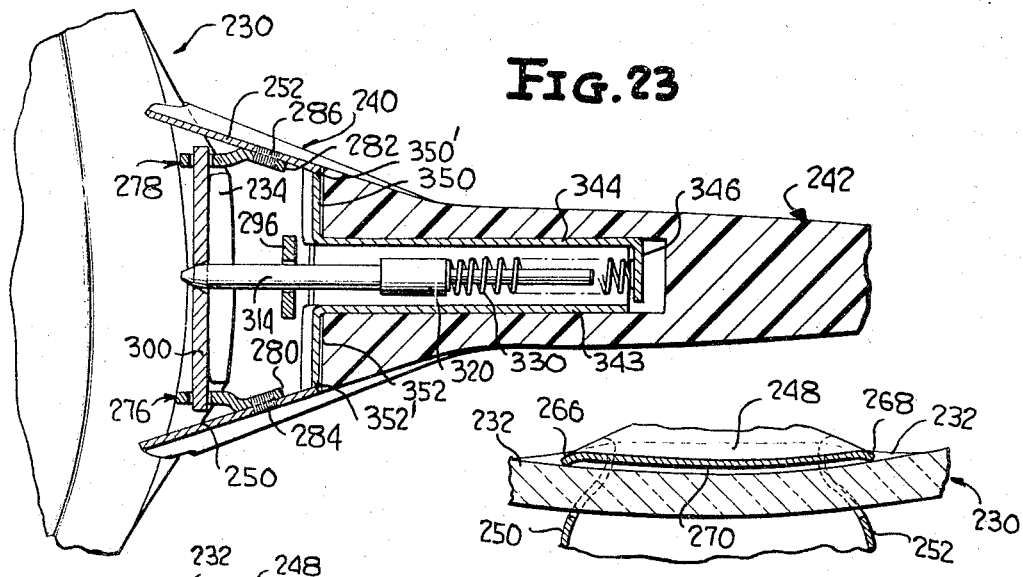

United States Patent Office 3,306,648
Patented Feb. 28, 1967

3,306,648
DETACHABLE HANDLE APPARATUS
Anthony W. Serio, Hillcrest Road, Elmira, N.Y. 14903
Filed Mar. 17, 1965, Ser. No. 446,461
24 Claims. (Cl. 294—16)

The present application is a continuation-in-part of co-pending U.S. patent application Serial No. 413,194, filed November 23, 1964.

The present invention relates to new and novel detachable handle apparatus, and more particularly to a detachable handle apparatus which is adapted to be quickly and easily attached to articles such as casserole dishes and the like.

When using casserole dishes or the like, a dish often becomes very hot as a result of cooking foods in an oven or the like, and it is desired to provide means for lifting the dish from place to place without the necessity of handling it with bulky heat-insulating pads and the like.

It is accordingly a principal object of the present invention to provide a detachable handle which can be quickly and easily attached to and removed from such a dish for lifting and handling the dish without the necessity of actually touching the dish, and further providing a heat-insulating means which prevents discomfort to the hands of the user.

It is additionally important to provide a detachable handle mechanism which, when mounted in position on a dish, presents a neat and pleasant appearance, and which provides a construction which is relatively compact and light in weight.

The above objectives are accomplished by providing a detachable handle apparatus which cooperates with a casserole dish or the like having integral extensions formed thereon and provided with a lip with which the handle apparatus is adapted to cooperate.

A particular advantage of the present invention is the fact that the handle apparatus may be attached and removed from a casserole dish while holding the handle in one's hand and by operating a suitable actuating means with one or more fingers of the hand, and preferably with the thumb. With this arrangement, the other hand is free to be used as desired, and a most effective and simple method is provided for manipulating the handle into and out of clamping relationship with respect to a casserole dish and the like.

This one hand operation is afforded in the present invention by providing an actuating means including a detent mechanism which extends above the upper surface of the handle portion of the apparatus in such a position that it is readily accessible and engageable by the thumb of the person holding the handle portion within his hand, and a simple sliding movement and pivotal movement of this detent mechanism is all that is required in order to move the actuating means into and out of position for clamping the handle apparatus on an associated container and the like.

The detent mechanism of the actuating means also provides an arrangement whereby the actuating means may be positively locked in a release position, the actuating means being resiliently urged in a direction to cause clamping of the apparatus on a container and the like such that the handle apparatus will become automatically locked onto an article to be clamped upon release of the detent mechanism.

An important feature of the present invention is the novel arrangement whereby the body means of the handle apparatus is provided with guide means in the form of elongated slots which permit both sliding and pivotal movement of the clamping member. This clamping member is of non-circular cross-sectional configuration and is actually substantially rectangular in cross-section. The extension of a container with which the apparatus is adapted to be associated is provided with a downwardly extending lip, and the handle apparatus is so arranged that the clamping means is adapted to rotate slightly or pivot with respect to the handle apparatus so as to ensure that a tight clamping action is obtained against this depending lip portion on an associated container. This sort of tilting or pivotal movement of the clamping means ensures that a tight and positive clamping of the associated article will be obtained regardless of slight variations in the dimensions of the extension and lip on the article as occur due to manufacturing tolerances.

A modified form of the invention is provided which incorporates an improved structural arrangement that is more readily manufactured at less cost and which can be easily assembled in a minimum amount of time. This modified form of the invention is so constructed that the overall arrangement is very rigid and strong, the body means being formed of a plurality of members which are welded to one another, the body means in turn being securely bonded to the handle portion as by an epoxy resin adhesive means. The clamping portion of this body means is provided with a novel construction wherein a pair of spaced offset contact portions are provided to give a two-point engagement with the upper side of a part of a container to be clamped, while the clamping means is adapted to engage the opposite side of the portion to be clamped. This two-point engagement ensures that the clamping portion will be properly engaged with containers of slightly different shape and size as may be encountered due to normal manufacturing tolerances.

In the modified form of the invention, the body means is also provided with a tongue portion which extends laterally therefrom and which is snugly received within a slot provided in the handle portion. With this arrangement, the interengagement of the tongue and slot serves to resist relative turning and lateral movement of the body means with respect to the handle portion to additionally ensure that a very rigid overall assembly is provided. The various components of this modified form of the invention are adapted to readily be interconnected with one another as required and the components can be quickly and easily inserted into the final operative relationship.

An object of the present invention is to provide new and novel detachable handle apparatus which is particularly adapted for use with casserole dishes and the like having an extension and a depending lip formed thereon.

Another object of the invention is the provision of detachable handle apparatus which is very attractive in appearance and which can be quickly and easily attached to or removed from a dish or the like with a one-hand operation simply by pivoting and sliding a portion of the actuating means relative to the adjacent handle portion.

A further object of the invention is to provide an actuating means which is normally biased in a direction to cause automatic clamping of the handle apparatus on an associated container.

Still another object of the invention is to provide detachable handle apparatus including mechanism for selectively latching the actuating means in a release position.

A still further object of the invention is the provision of detachable handle apparatus including a clamping means which provides a positive clamping action and which compensates for normal manufacturing tolerances.

Yet another object of the invention is to provide detachable handle apparatus including means for preventing accidental release of the clamping mechanism under load, and wherein surfaces of different slope are provided at the actuating end portion of the actuating means to initially urge the clamping means toward clamping position and to subsequently provide a surface which will not tend to cause the actuating means to release under load.

A still further object of the invention is to provide detachable handle apparatus which is quite simple and inexpensive in construction, and yet which is quite sturdy and reliable in operation.

A further object of the invention is to provide a modified arrangement which is more readily manufactured at less cost and which can be easily assembled in a minimum amount of time.

Still another objects is the provision of detachable handle apparatus which provides a very rigid and strong assembly and wherein undesired relative movement between the parts is prevented.

Yet a further object of the invention is to provide detachable handle apparatus wherein the clamping portion of the body means provides a two-point engagement with a portion of a container to be clamped to accommodate containers of varying size and shape.

Other objects and many attendant advantages of the invention will become more apparent when considered in connection with the specification and accompanying drawings, wherein:

FIG. 1 is a top exploded perspective view illustrating the handle apparatus of the present invention, along with a casserole dish or the like with which it is adapted to be employed;

FIG. 2 is a top perspective view with the components of FIG. 1 in reverse relationship and illustrating the handle apparatus in operative position on the container;

FIG. 2a is a bottom view of the handle apparatus;

FIG. 3 is a view partly in section taken along the longitudinal axis of the handle apparatus;

FIG. 4 is a view similar to FIG. 3 illustrating the handle apparatus mounted in clamping position on the container;

FIG. 5 is a sectional view taken substantially along line 5—5 of FIG. 4 looking in the direction of the arrows;

FIG. 6 is a sectional view taken substantially along line 6—6 of FIG. 4 looking in the direction of the arrows;

FIG. 7 is an enlarged view of the terminal end of the actuating means and the adjacent portions of the clamping means illustrating the interaction therebetween;

FIG. 8 is an exploded perspective view illustrating the various components of the handle apparatus;

FIG. 9 is an enlarged exploded view illustrating the details of construction of the detent mechanism of the actuating means;

FIG. 10 is a view similar to FIG. 9, illustrating a modified form of the invention;

FIG. 11 is an enlarged sectional view illustrating a further modification of the invention;

FIG. 12 is an enlarged sectional view illustrating a further modification of the invention;

FIG. 13 is an enlarged sectional view illustrating a further modification of the invention;

FIG. 14 is an enlarged sectional view illustrating a further modification of the invention;

FIG. 15 is a sectional view of a still further modified form of the invention shown in clamped relationship on an associated container;

FIG. 16 illustrates the structure shown in FIG. 15 in its released position with the handle apparatus separated from the container;

FIG. 17 is a top exploded perspective view partly broken away illustrating a modified form of the invention;

FIG. 18 is a top perspective view showing the structure of FIG. 17 in assembled relationship;

FIG. 19 is a bottom view of the components illustrated in FIG. 17;

FIG. 20 is a sectional view taken substantially along line 20—20 of FIG. 17 looking in the direction of the arrows;

FIG. 21 is a sectional view taken substantially along line 21—21 of FIG. 18 looking in the direction of the arrows;

FIG. 22 is an enlarged sectional view illustrating a portion of the structure shown in FIG. 21;

FIG. 23 is a sectional view taken substantially along line 23—23 of FIG. 21 looking in the direction of the arrows;

FIG. 24 is a sectional view taken substantially along line 24—24 of FIG. 21 looking in the direction of the arrows;

FIG. 25 is a sectional view taken substantially along line 25—25 of FIG. 22 looking in the direction of the arrows; and FIG. 26 is a top exploded perspective view illustrating the various components of the modified form of the invention.

Referring now to the drawings wherein like reference characters designate corresponding parts throughout the several views, there is shown in FIGS. 1–9 inclusive a first modification of the invention, the handle apparatus being adapted for use with a casserole dish or the like indicated generally by reference numeral 20, and including an integral extension or ear extending outwardly therefrom at one side thereof, this extension having a downwardly extending lip 24 at the outer edge thereof, the lip defining a shoulder 26 which is adapted to cooperate with the clamping means of the detachable handle apparatus for positively retaining the handle in locked relationship with the dish. The dish is also provided with a sloping outside surface 28 adapted to engage a portion of the body means hereinafter described.

The handle apparatus includes a body means indicated generally by reference numeral 30 and a hand grip portion indicated generally by reference numeral 32, the hand grip portion being preferably formed of a heat insulating material such as plastic and the like and being provided with a suitable outer configuration so as to be readily held in the hand. This hand grip portion includes an extension 34 at the inner end thereof which flares outwardly from the main body portion of the hand grip portion.

Referring now particularly to FIG. 8, the body means of the handle apparatus includes a first portion indicated generally by reference numeral 40 and a second portion indicated generally by reference numeral 42. Portion 40 includes an upper wall 44 which is adapted to rest upon the upper wall of extension 34 of the hand grip portion. Body portion 40 also includes integral depending side walls 46 and 48, the forward edges 46' and 48' of these side walls respectively having a sloping configuration and being adapted to fit against the outer sloping surface of an associated container. Side walls 46 and 48 include inwardly projecting flanges 50 and 52 along the lower edge of these wall portions respectively. The rear parts of flanges 50 and 52 are extended toward one another and are bent first downwardly as indicated by reference numerals 50' and 52' and then are bent upwardly and back upon themselves to define channel portions indicated generally by reference numerals 50'' and 52'' respectively.

Portion 42 of the body means includes a lower wall portion 60 which may be cut away as indicated at 62, although this is not necessary. Integral upstanding side walls 64 and 66 are disposed at opposite sides of the bottom wall 60, and an upstanding back wall 68 is also formed integral with the bottom wall. The side walls 64 and 66 are provided with elongated substantially straight slots 70 and 72 respectively. These guide slots are disposed at such an angle as seen in FIG. 4 that when the handle apparatus is in operative clamped position, the clamping means hereinafter described will be properly moved into the clamping position shown.

The clamping means includes an elongated clamping member 80 which is of non-circular cross-sectional configuration and is preferably substantially rectangular in cross section. This clamping member includes an upper edge portion 82 which is rounded and adapted to fit relatively snugly within the corner defined by shoulder 26 of the lip 24 on the container and the under surface of the extension 22. The clamping member is illustrated in such relationship in FIG. 4 of the drawings.

As seen particularly in FIG. 8, clamping member 80 includes reduced portions 84 and 86 at the opposite ends thereof which are received within slots 70 and 72 respectively for guiding movement of the clamping member. It is important to note as seen for example in FIG. 7 that the extensions 84 and 86 which are of the same thickness as the main body portion 80 will be received rather loosely in the associated slots, and the clearance between extension 84 which is not visible in FIG. 7 and the associated slot 70 will be clearly noted. This amount of clearance permits tilting and pivotal movement of the clamping member with respect to the slots and associated body means so that the clamping member will be pivoted into the final clamping position shown in FIG. 4. This ensures that positive clamping against the shoulder portion 26 of the lip on the container will be obtained regardless of manufacturing tolerances.

Clamping member 80 is provided with a centrally located tapered hole 88, the configuration of which may be seen most clearly in FIG. 7.

When the two body portions 40 and 42 as seen in FIG. 8 are assembled into the operative position shown in FIGS. 3 through 6 inclusive, these two body portions are spot welded to one another at appropriate points. This serves to hold these two portions in rigid relationship to one another. The body portion 40 is fitted around extension 34 of the hand grip portion. The inwardly projecting channel portions 50 and 52 of body portion 40 are adapted to fit within a recess 90 formed in the under surface of the extension 34 of the hand grip portion. A clip member indicated by reference numeral 92 is provided with a pair of channel portions 94 and 96 which are adapted to cooperate with the channel portions 50'' and 52'' of body portion 40 for holding the channel portions 50'' and 52'' in adjacent relationship to one another and in tightly clamping relationship to the extension 34. It will be seen that when the clip member 92 is in its operative position, the body means fits snugly about extension 34 and up against the face 98 defined between the extension and the main body portion of the hand grip part of the apparatus.

The actuating means for moving the clamping means into operative clamping position includes an elongated rod 100, which may be of substantially cylindrical configuration, this actuating rod being slidably positioned within a bore 102 provided in hand grip portion 32 and also being slidable through an opening 104 provided in the back wall 68 of body portion 42.

The outer end of the elongated actuating member 100 includes a first sloping surface or portion 110 which joins with a second sloping surface 112. Sloping surface 110 is substantially complementary to the interengageable surface of tapered hole 88 formed in the clamping member as seen in FIG. 7. Accordingly, when the actuating member 100 is moved in the direction of the arrow as seen in FIG. 7, sloping surface 110 will engage the cooperating surface of tapered hole 88 and relatively rapidly move the clamping member upwardly in the direction of the arrow shown in FIG. 7, and will finally force the clamping member into the tilted or cocked position shown in FIG. 4, wherein it tightly engages against the shoulder of the lip on the associated container.

After the clamping member has moved into its operative clamped position, the upper edge portion of hole 88 which is then resting on surface 112 will be in the operative position shown in FIG. 4. Due to the difference in angularity between the tapered surface of hole 88 and the sloping portion 112, there will not be developed a strong enough force to tend to cam the actuating member 100 back toward a release position. If the surface 112 were to have the same slope as the engaging portion of hole 88, a greater camming force would be exerted which might tend to cause accidental release of the apparatus. However, the provision of this difference in slope as aforedescribed ensures that sufficient forces will not be developed so as to cause the actuating member 100 to be moved backwardly to a release position from the locking or clamping position shown in FIG. 4.

As seen most clearly in FIGS. 3–5, actuating rod 100 is fixed to a sliding block 114 which is slidably positioned within a slot 116 formed in the hand grip member and which opens upwardly from the hand grip member. A compression spring 118 is positioned within an enlarged cavity portion 120 which is in communication with slot 116 and which also serves to receive the lower portion of sliding block 114. It will be noted that compression spring 118 normally urges sliding block 114 and the actuating rod 100 fixed thereto toward the left as seen in these figures to urge the actuating mechanism into such a position as to cause the clamping member to move into the clamping position as shown in FIG. 4.

The upper portion of sliding block 114 is bifurcated as indicated at 114' and is adapted to receive a downwardly extending projection 130 formed on a detent member indicated generally by reference numeral 132, the detent member being pivotally mounted upon a pin 134 which extends through suitable aligned openings provided in the bifurcated end portion of sliding block 114 and the extension 130 of the detent mechanism.

As seen particularly in FIG. 9, detent mechanism 132 includes a downwardly extending stop portion 134 having a stop face 136 formed thereon. Stop portion 134 is adapted to be received within a recess 138 provided in the hand grip portion, and a stop surface 140 is adapted to engage surface 136 so as to latch the actuating mechanism in a released position as illustrated in FIG. 3.

The hand grip portion of the handle apparatus is also cut away as indicated at 142 to receive the detent mechanism, cutout 142, of course, being in communication with slot 116 previously described. The detent mechanism is also contoured along the upper surface thereof as indicated by reference numeral 144 so as to be readily engaged by the thumb of a person holding the hand grip apparatus so as to readily pivot and slide the detent mechanism as desired. An extension 146 is provided so as to overlie the cutout provided in the hand grip member as shown in FIG. 3 when the detent mechanism is in the release latch position so as to enhance the appearance of the apparatus and to protect the components disposed within the cutout portion and slot portions of the hand grip member.

Referring now to FIG. 10, a modification is illustrated wherein the detent member 132' is substantially the same as that previously described, the only difference being that the stop portion 134' is provided with a hardened face 150. Whereas the hand grip portion 32 and the detent means 132 of the modification shown in FIG. 9 are for example to be formed of plastic and the like, the hardened portion 150 of FIG. 10 may comprise a metallic portion to increase the wear characteristics of this particular part of the apparatus. The hand grip portion 32' is substantially similar with the portion 32 previously described with the exception that a hardened insert 152 of metal or the like is provided for engaging portion 150 on the detent part 132' to thereby enhance the wear characteristics of the hand grip member as well.

Referring now to FIG. 11 of the drawings, a further modified form of the invention is illustrated. In this modification, the extension 22 of the caserole dish or the like and its downwardly extending lip are identical with those previously discussed. On this enlarged scale it will be noted that the opposite side surfaces of lip 24 define sloping surfaces 24'. The handle apparatus is substantially identical with that previously described, and similar parts have been given the same reference numerals primed. The only difference in this construction is in the particular cross-sectional configuration of the clamping member 160. This clamping member is provided with a central tapered hole 162 identical with the hole 88 previously described.

The upper edge of clamping member 160 is provided with a recess 164 including a bottom wall portion 166 and sloping side wall portions 168. It will be noted as seen in this figure that recess 164 is substantially complementary to the lower portion of lip 24 and is adapted to snugly receive the lip so as to provide a very effective clamp action between the clamping member and the clamping portion 44' of the body means of the handle apparatus.

Referring now to FIG. 12 of the drawings, a further modified form of the invention is illustrated wherein the operation lies in the provision of a clamping member 170 having a hole 172 formed therein similar to those previously discussed. A separate clamping portion 174 is suitably secured as by welding to member 170 and includes a base portion 176 having a pair of side wall portions 178 sloping upwardly therefrom. It will be noted that portion 176 and 178 provide a recess which is indicated generally by reference numeral 180 and which is substantially complementary to the undersurface of lip 24 so as to provide a very good clamping effect therewith.

Referring now to FIG. 13 of the drawings, a still further modified form of the invention is illustrated which is somewhat similar to that shown in FIG. 12. In the modification shown in FIG. 13, the clamping member 184 is provided with a tapered hole 186 as previously discussed. Member 184 also includes an integral offset portion 188 defining a recess 190 in the upper surface thereof which is substantially complementary to the undersurface of lip portion 24 of the container for snugly receiving this lip portion and for providing a good clamping effect therewith.

Turning now to FIG. 14 of the drawings, a still further modified form of the invention is illustrated, wherein the clamping member 194 is provided with a central tapered hole 196 similar to that previously discussed. A separate member indicated generally by reference numeral 198 is rigidly attached as by welding to the upper portion of member 194, and defines a central recess 200 having a configuration which is substantially complementary to the undersurface of lip portion 24 so as to provide a good clamping effect therewith. Member 198 also includes a depending lateral portion 202 at one side thereof and an upstanding lateral portion 204 at the opposite side thereof which is adapted to conform to and engage against the outer surface of lip 24 to provide a very effective engagement therewith.

Referring now particularly to FIGS. 15 and 16 of the drawings, a still further modified form of the invention is illustrated wherein the handle apparatus is similar to that previously described and similar parts have been given the same reference numerals primed. This modified form of the handle apparatus is adapted to be employed with the same casserole dish 20 as previously referred to. This modification employs the same body means and actuating means and detent mechanism as that previously described, with the exception that the terminal end of the actuating rod 210 of this particular modification is not provided with one or more tapered surfaces, but rather includes a substantially U-shaped portion including a first leg portion 212 fixed to the outer end of rod 210, a leg portion 214 extending substantially perpendicularly from leg portion 212 and a third leg portion 216 extending substantially perpendicularly from leg portion 214.

The three leg portions 212, 214 and 216 define a space which loosely receives the clamping means in the form of a clamping member 220 similar to the clamping means employed in the modification shown in FIGS. 1–9, wherein the clamping means is substantially rectangular in cross-sectional configuration. In the modification shown in FIGS. 15 and 16, the reduced end portions at opposite ends of the clamping member may be formed as substantially cylindrical trunnion-like portions indicated by reference numeral 222, each of these reduced end portions being adapted to slide within arcuate slots 224 provided in opposite sides of the body means.

The apparatus is shown in its operative clamped position in FIG. 15, and the handle apparatus is shown as released from the container in FIG. 16. It will be noted that when the actuating rod 210 is moved into the release position as shown in FIG. 15, the clamping member 215 pivots into the position shown in FIG. 16, and the portion 222 will drop into the lower parts of slots 224.

It will be understood that the apparatus can be latched in this release position by a detent mechanism identical with that previously described.

When the handle apparatus is moved into the operative clamping position shown in FIG. 15, the rod 210 moves to the left thereby moving the lower portion of clamping membr 220 to the left causing the clamping member to pivot into the position shown. With this arrangement, the clamping member 220 is adapted to pivot with respect to the associated guide slots in the body means in order to provide the same type of positive clamping action against the shoulder of the lip on the container as previously discussed.

It is apparent that the arcuate slots cooperate with the reduced portions 222 of the clamping mechanism to guide the clamping mechanism into its proper operative clamping position in conjunction with the sliding movement of actuating rod 210 and the U-shaped portion including leg portions 212, 214 and 216.

Referring now to FIGS. 17–26 inclusive, a modified form of the invention is illustrated wherein a casserole dish or the like is indicated generally by reference numeral 230, and includes an integral extension or ear 232 extending outwardly therefrom at one side thereof, this extension having a downwardly extending lip 234 at the outer edge thereof. The lip defines a shoulder 236 which is adapted to cooperate with the clamping means in a manner similar to that previously described. The container is also provided with a sloping outside surface 238 adapted to engage portions of the body means as hereinafter described.

The handle apparatus includes a body means indicated generally by reference numeral 240, the various components of this body means being formed of a suitable rigid metallic substance such as stainless steel and the like. The handle apparatus also includes a hand grip or handle portion indicated generally by reference numeral 242 and formed of a suitable heat insulating material such as plastic and the like the handle portion being provided with a suitable outer configuration so as to be readily held in the hand.

Referring now particularly to FIG. 26 of the drawings, the body means of the handle apparatus includes three separate portions, the first portion being indicated generally by reference numeral 244, the second portion being indicated generally by reference numeral 245, and the third portion being indicated gnerally by reference numeral 246.

Body means portion 244 includes an upper wall 248 which joins with integral depending side walls 250 and 252 including forward edges 250' and 252' respectively which have a sloping configuration and the lower portions of which are adapted to fit against the outer sloping surface of the associated container. The side walls 250 and 252 join with bottom wall portions 254 and 256 which extend inwardly toward one another with the adjacent edges thereof abutting together.

The top wall 248 of the first body means portion defines a clamping portion, this clamping portion including a pair of spaced offset contact portions which are bent downwardly as seen in the drawings, these spaced portions 266 and 268 defining downwardly facing points which are adapted to engage spaced portions of the upper surface of a projection on an associated container. The part of the clamping portion of the body means between the two offset contact portions 266 and 268 comprises a downwardly facing arcuate surface 270 which is normally spaced from the adjacent upper surface of a projection on an associated container. This arrangement affords a two-point contact of the clamping portion with the upper surface of the part of the container to be clamped. The engagement of the forward edges 250' and 252' with the outer sloping surface of the container provides a total of four points of contact between this first body means portion and the associated container.

The second body means portion 245 includes a lower wall 274 which joins with integral upstanding side walls indicated generally by reference numerals 276 and 278. These side wall portions include rear parts 280 and 282 which are adapted to fit flush against the inwardly facing surfaces of side walls 250 and 252 respectively of the first body means portion and to be spot welded in operative relationship as indicated in FIG. 3 by reference numerals 284 and 286. The spot welding of these members together serves to provide a rigid interconnection of the members and prevents spreading of the bottom wall portions 254 and 256 of the first body means portion.

The side wall portions 276 and 278 of the second body means portion are provided with elongated substantially straight guide means or slots 290 and 292 respectively. These guide slots are disposed at such an angle as seen in FIG. 21 that when the handle apparatus is in operative clamped position, the clamping means hereinafter decsribed will be properly moved into clamping position.

Body means portion 245 also includes an integral upstanding back wall portion 296 which extends upwardly from the bottom wall 274, back wall 296 having a central hole 298 formed therethrough.

The clamping means 300 may be substantially identical with the clamping means 80 previously described, and is of non-circular cross-sectional configuration and preferably substantially rectangular in cross section. This clamping member also includes an upper edge portion 302 which is rounded and adapted to fit snugly within a corner defined shoulder 236 of the lip 234 and the undersurface of extension 232.

As seen most clearly in FIG. 26, clamping member 300 includes opposite reduced end portions 304 and 306 which are received within guide slots 290 and 292 respectively for guiding movement of the clamping member. As in the previous modification, extensions 304 and 306 are loosely received in the associated slots to permit tilting and pivotal movement of the clamping member with respect to the slots and the associated body means to ensure positive clamping against the shoulder portion 236 of the lip on the container regardless of manufacturing tolerances.

Clamping member 300 is provided with a centrally located tapered hole 310 which is substantially identical with the tapered hole 88 previously described.

The actuating means of this modification includes an elongated rod 314 which may be of substantially cylindrical configuration and which is slidably supported within the hole 298 of the second body means portion and which is further received within the hollow third body means portion 246. The outer end of the actuating rod includes a first sloping surface 316 which joins with a second sloping surface 318, these sloping surfaces being substantially identical with the sloping surfaces 110 and 112 previously described and cooperating in the same manner with the associated clamping means. As in the previous modification, the clamping means 300 is adapted to be moved into the tilted or cocked locking position as seen particularly in FIG. 21.

A clevis or sliding block indicated generally by reference numeral 320 is provided at the lower portion thereof with a bore formed therethrough which snugly receives rod 314, the rod being secured in this bore by a suitable means such as an epoxy resin or the like so as to firmly bond the two members together. Member 320 includes a pair of spaced upstanding wall portions 322 and 324 having holes 322' and 324' respectively formed therethrough which are adapted to receive a pivot pin 326.

A coil compression spring 330 is disposed about the rear portion of rod 314 and serves to normally bias the actuating means toward the clamping position as hereinafter described.

The third body means portion 246 includes a top wall portion 342 which joins integrally at opposite edges thereof with depending substantially parallel side wall portions 343 and 344. An end wall 346 is formed integral with one end of side wall 343 and extends substantially normally thereto. The spring 330 bears against end wall 346 so as to urge the member 320 and the actuating means toward the clamping position.

A pair of ears 350 and 352 are formed integrally with the forward portions of side walls 343 and 344 respectively, these ears extending laterally therefrom. The outer portions 350 and 352 are secured as by spot welds 350' and 352' respectively to the inner surfaces of side walls 252 and 250 respectively of the first body means portion 244.

The third body means portion 246 is provided with a first slot formed through the upper wall 342 thereof, this slot extending substantially longitudinally of this body means portion. A second slot 362 is provided, this slot extending laterally of the body means portion and also being formed through the upper wall portion 342. This slot may also extend partially downwardly through the side wall portions 343 and 344.

The detent mechanism for holding the actuating means in the release position in this modification includes a manually engageable means indicated generally by reference numeral 366. Member 366 is provided with a serrated portion 368 on the forward upper surface thereof which is adapted to be engaged by thumb of a person's hand when gripping the apparatus. A depending portion 370 is provided which extends downwardly through slot 360 in body means portion 246. Depending portion 370 is provided with a hole 372 formed therethrough which receives pin 326 so as to pivotally interconnect member 366 with member 320.

The depending portion 370 of the manually engageable means 366 is adapted to slide back and forth within slot 360 during movement of the actuating means. Manually engageable means 366 is also provided with a depending portion 374 which is adapted to fit within slot 362 of the third body means portion for holding the actuating means in the release position.

A spring means 376 as seen most clearly in FIGS. 20 and 21, is wrapped around pin 326 and normally engages the undersurface of manually engageable means 366 as seen in these figures to tend to rotate the manually engageable means in a clockwise direction around pin 326. This spring means accordingly serves to normally urge member 366 toward the latching position shown in FIG. 20 wherein the depending portion 374 thereof is disposed within slot 362 provided in the third body means. This of course will retain the actuating means in its release position.

As seen most clearly in FIG. 26, the handle portion 242 is provided with a longitudinally extending bore 380 which opens at one end thereof and which is of a generally rectangular cross-sectional configuration so as to snugly receive the third body means portion 246. A first enlarged slot portion 382 is provided in the upper wall of the handle portion and is adapted to snugly receive the tongue portion 260 of the first body means portion. This interengagement between the tongue portion 260 and the enlarged slot portion in the handle portion serves to prevent undesired relative movement between the body means and the handle portion after the apparatus is assembled in the final operative position.

The upper part of handle portion 342 is also provided with an elongated narrow slot 384 which is in communication with the enlarged slot 382. Slot 384 is aligned with the cutout portion 362 formed in tongue 360 and these aligned portions allow the depending portion 370 of member 366 to move forward and backward as required during operation of the apparatus, and further permits the depending portion 374 of member 366 to enter into the slot 362 provided in body means portion 246.

When assemblying the various components as illustrated in FIG. 26, the body means, actuating means and detent mechanism may first be completely assembled whereupon this assembly is slipped into the bore formed in the handle apparatus. A suitable layer of epoxy resin or the like as indicated by reference numeral 388 may be provided on the outer end of the handle portion, and it will be apparent that the rearwardly facing portions of ears 350 and 352 will be bonded to the end face of handle portion 242 by this layer of epoxy resin when the apparatus is assembled. In addition, the walls of the third third body means portion 246 may be bonded to the inner walls of bore 380 in the handle portion by epoxy resin or the like, thereby very rigidly securing the various components together.

It is apparent from the foregoing that there is provided according to the present invention new and novel detachable handle apparatus which is particularly adapted for use with casserole dishes and the like. The handle apparatus is very attractive in appearance and forms a particularly neat unit in conjunction with the cooperating casserole dish. The handle apparatus can be quickly and easily attached to or removed from the dish simply by manually sliding the operating portion of the actuating means along the handle and pivoting it into and out of latching position. This can be accomplished with the thumb of the hand while holding the hand grip portion of the handle apparatus in the hand. This, of course, enables one-hand operation and frees the other hand of a person for use as desired.

The arrangement is such that the clamping mechanism is automatically moved into its clamping position when the detent mechanism is released, and the clamping mechanism will be locked in its operative clamping position so as not to accidentally release. The sloping surfaces provided on the actuating means of certain modifications assure that the apparatus does not accidentally release, and yet at the same time provides an arrangement which prevents binding of the apparatus in clamping position which might make the apparatus difficult to release. The actuating mechanism includes a means for latching it in release position, and yet may be readily manually operated into locking position in an automatic manner when desired.

The arrangement of the clamping means is such as to provide a positive clamping action which compensates for manufacturing tolerances in the associated container which has an extension and a lip formed thereon for receiving this particular clamping mechanism. The apparatus is furthermore quite simple and inexpensive in construction, and yet at the same time is quite sturdy and reliable in operation.

The modified form of the invention provides an improved structural arrangement which can be more readily manufactured at less cost and which can be easily assembled in less time. This arrangement provides a very rigid and strong assembly since the various components are welded together and bonded by an epoxy resin or the like. The interengagement of the tongue of the first body means portion with the enlarged slot formed in the handle portion prevents undesirable relative movement between the body means and the handle portion and further serves to rigidify the assembled structure. In addition, the clamping portion of this modification provides a unique two-point engagement with the upper surface of a portion to be clamped on a container in order to compensate for various manufacturing tolerances or differences in sizes and shapes.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Detachable handle apparatus comprising a body means, clamping means of non-circular cross sectional configuration movably supported by said body means, said body means including spaced guide means for engaging and guiding movement of said clamping means into clamping position, actuating means movably supported for engagement with said clamping means to move the clamping means into clamping position, and means permitting tilting movement of said clamping means with respect to the guide means in a direction transverse to said guided movement in order to provide for positive clamping of an article to be clamped in the apparatus.

2. Detachable handle apparatus comprising body means, said body means including a clamping portion for engaging a member to be clamped, said body means also including spaced guide means, elongated clamping means of non-circular cross sectional configuration having spaced portions thereof engageable with said guide means for guiding movement of the clamping means, actuating means movably supported within said body means for engaging said clamping means to move it into clamping relationship, said spaced portions of said clamping means being movable with respect to the associated guide means to permit tilting movement of the clamping means with respect to the guide means and associated body means in a direction transverse to said guided movement to permit positive clamping action on a member to be clamped.

3. Detachable handle apparatus comprising a body means including a clamping portion for engaging a member to be clamped, said body means having spaced guide slot means formed therein, elongated clamping means of now-circular cross sectional configuration having spaced portions thereof disposed within said guide slot means for guided movement therewithin, actuating means movably supported with respect to said body means, one end portion of said actuating means being engageable with said clamping means for moving the clamping means relative to said guide slot means and into clamping position, said guide slot means being elongated to permit movement of the clamping means toward and away from the clamping portion of said body means, and means for permitting tilting movement of said actuating means with respect to the associated guide slot means in a direction transverse to said guide movement.

4. Detachable handle apparatus comprising body means having a clamping portion for engaging a member to be clamped, said body means also including spaced guide slots, elongated clamping means of non-circular cross sectional configuration having spaced portions thereof slidably and tiltably positioned within said guide slots, actuating means movably supported with respect to said body means and having one end portion thereof engageable with said clamping means for moving the clamping means into clamping position, means normally biasing said actuating means toward its clamping position in engagement with said clamping means, and detent mechanism for holding said actuating means in a released unclamping position.

5. Detachable handle apparatus comprising body means, clamping means movably supported by said body means, said body means including a clamping portion for engaging a member to be clamped, actuating means for moving said clamping means laterally toward said clamping portion for engaging a member to be clamped, said actuating means being movably supported with respect to said body means, resilient means normally biasing said actuating means towards and into engagement with said clamping means to move the clamping means into operating clamping position, and detent mechanism for holding said actuating means in a release position so as to allow the clamping means to move to an unclamped position, said detent mechanism being pivotally interconnected with a portion of said actuating means and movable therewith toward and away from said clamping means.

6. Detachable handle apparatus comprising a handle portion, body means supported at one end of said handle portion, clamping means movably supported by said body means, said body means including guide means and a clamping portion for engaging a member to be clamped, said clamping means being movable within said guide means toward and away from said clamping portion, actuating means movably supported by said handle portion and engageable with said clamping means for moving said clamping means into operative clamping position, resilient means normally biasing said actuating means toward said clamping means to move the clamping means into clamping position, detent mechanism pivotally interconnected with a portion of said actuating means, said handle portion including a stop portion, said detent mechanism including a cooperative engageable portion for engaging the stop portion to hold the detent mechanism in a released position, said detent mechanism including an accessible portion adapted to be manually engaged for operating the detent mechanism to enable the actuating means to move into the clamping position.

7. Detachable handle apparatus comprising a body means, said body means including a clamping portion for engaging a member to be clamped, said body means also including spaced guide means, elongated clamping means of non-circular cross sectional configuration including spaced portions mounted within said guide means for guiding movement of said clamping means toward and away from said clamping portion of the body means, said clamping means having cam means thereon, actuating means including cam means for engaging the cam means on said clamping means, means normally resiliently biasing said actuating means toward said clamping means and into clamping position, said actuating means including detent mechanism interconnected therewith for holding the actuating means in a released position, said guide means providing a clearance with the associated spaced portions of the clamping means to permit tilting movement of said clamping means with respect to said guide means and the body means.

8. Detachable handle apparatus comprising a handle portion, body means mounted at one end of said handle portion and including spaced guide means, elongated clamping means of non-circular cross sectional configuration having spaced portions thereof slidably disposed within said guide means and movable with respect thereto for guiding movement of the clamping means with respect to the body means, said clamping means being tiltable with respect to said guide means and said body means, an elongated actuating means movably supported by said handle portion and engageable with said clamping means for moving the clamping means into operative clamping position, resilient means normally biasing said actuating means toward said clamping means to move the clamping means into clamping position, said actuating means including a detent mechanism pivotally connected with a portion of said actuating means, said detent mechanism including a stop portion, the handle portion having a cooperating stop portion for engaging the stop portion on the detent mechanism to hold the actuating means in a release position.

9. Apparatus as defined in claim 8 wherein the guide means of said body means comprises a pair of spaced slots, said slots defining a clearance with the associated portions of the clamping means to permit the clamping means not only to slide within the associated slots but also to tilt to a certain extent with respect thereto so as to provide a positive clamping action.

10. Apparatus as defined in claim 8 wherein said clamping means includes a recessed portion for relatively snugly receiving a correspondingly shaped lip formed on an article to be clamped.

11. Detachable handle apparatus comprising a handle portion, body means supported at one end of said handle portion and including spaced guide means, said body means including a clamping portion for engaging a member to be clamped, elongated clamping means of non-circular cross sectional configuration, spaced portions of said clamping means being positioned within said guide means for guiding movement of said clamping means toward and away from said clamping portion, elongated actuating means movably supported by said handle portion, the outer end of said actuating means including a portion for loosely receiving said clamping means to permit tilting movement of the clamping means with respect to the associated end of the actuating means, means normally resiliently biasing said actuating means into position to urge the clamping means into clamping position, and detent mechanism for holding the actuating means in a release position.

12. Apparatus as defined in claim 11 wherein said guide means of the body means includes a pair of spaced arcuate slots, said clamping means being mounted both for sliding movement and tilting movement within said slots.

13. Detachable handle apparatus comprising body means, said body means including a clamping portion for engaging a member to be clamped, said clamping portion having a pair of spaced offset contact portions adapted to engage spaced portions of a member to be clamped, said body means also including spaced guide means, elongated clamping means of non-circular cross sectional configuration having spaced portions thereof interengageable with said guide means for guiding movement of the clamping means, said clamping means being tiltable with respect to said guide means and said body means in a direction transverse to said guided movement actuating means movably supported within said body means for engaging said clamping means to move it toward a member to be clamped to clamp such member between said clamping means and said spaced offset contact portions of said clamping portion.

14. Apparatus as defined in claim 13 wherein the part of said clamping portion between said offset contact portions is generally arcuate in configuration.

15. Apparatus as defined in claim 13 wherein said spaced portions of said clamping means have a clearance with respect to the associated guide means to permit tilting movement of the clamping means with respect to the guide means and associated body means to permit positive clamping action on a member to be clamped.

16. Detachable handle apparatus comprising body means, said body means including a clamping portion defining a pair of spaced offset contact portions for engaging a portion of a container, said body means also including a pair of side walls having forward edges, a part of each of said forward edges being adapted to engage a portion of a container to be clamped, whereby said body means engages a container to be clamped at at least four spaced portions, said body means also including spaced guide means, elongated clamping means of non-circular cross sectional configuration having spaced portions thereof engageable with said guide means for guiding movement of the clamping means, actuating means movably supported within said body means for engaging said clamping means to move it into clamping relationship, said spaced portions of said clamping means being movable with respect to the associated guide means to permit tilting movement of the clamping means with respect to the guide means and associated body means to permit positive clamping action on a member to be clamped.

17. Detachable handle apparatus comprising body means, clamping means movably supported by said body means, said body means including a clamping portion for engaging a member to be clamped, actuating means for moving said clamping means laterally toward said clamping portion for engaging a member to be clamped, actuating means movably supported with respect to said body means, resilient means normally biasing said actuating means towards and into engagement with said clamping means to move the clamping means into operative clamping position, and detent mechanism for holding said actuating means in a release position so as to allow the clamping means to move to an unclamped position, said detent mechanism including a portion pivotally interconnected with part of said actuating means and movable therewith toward and away from said clamping means, resilient means normally urging said pivotally mounted portion of the detent mechanism in one direction of rotation about the pivot axis thereof, and means for engaging said pivotally mounted portion of the detent mechanism to hold it in a release position.

18. Detachable handle apparatus comprising body means, said body means including first, second and third portions, said portions being rigidly interconnected with one another, said first portion defining a clamping portion for engaging a container to be clamped and also defining a pair of spaced side walls the forward edges of which are adapted to engage the surface of a container to be clamped, said second portion including guide means, elongated clamping means having spaced portions thereof engageable with said guide means for guiding movement of the clamping means, said third portion of the body means being elongated and hollow, actuating means extending within said third portion and being movably supported for engaging said clamping means to move it into clamping relationship with respect to said clamping portion, an elongated handle portion, said handle portion having a hole therein receiving at least part of said third portion of the body means, said body means being fixedly secured to said handle portion.

19. Apparatus as defined in claim 18 wherein said first portion of the body means includes a pair of spaced offset contact portions for engaging the container to be clamped, and wherein said first body portion also includes a tongue portion projecting therefrom, said tongue portion being snugly received within a slot formed in said handle portion for resisting relative movement between said body means and said handle portion.

20. Detachable handle apparatus comprising body means, said body means including first, second and third portions, said first, second and third portions being welded to one another to provide a rigid assembly, said first portion defining a clamping portion having a pair of offset contact portions for engaging spaced parts of a container to be clamped, said clamping portion also defining a pair of spaced side walls the forward edges of which are adapted to engage the outer surface of the container to be clamped, said first body portion also defining a projecting tongue portion, said second body portion defining a pair of spaced guide slots, clamping means having spaced portions thereof engageable with said guide slots for guiding movement of said clamping means, said spaced portions of the clamping means being movable with respect to the guide slots to permit pivotal movement of the clamping means with respect to the guide slots and the associated body means to permit positive clamping action on the container to be clamped, said third body portion being elongated and including a pair of side walls, a top wall, an end wall, and being open at the bottom thereof, actuating means movably supported by said second body portion and being partly disposed within said third body portion, said actuating means being engageable with said clamping means to move the clamping means into clamping relationship with respect to said clamping portion, resilient means engaging said actuating means and said end wall of the third body means portion for urging the actuating means toward clamping position, detent mechanism including manually engaging means pivotally interconnected with said actuating means, said third body means portion including a pair of slots therein, said manually engageable means including a portion extending through one of said slots and including a second portion engageable within the other of said slots for holding the actuating means in a release position, an elongated handle portion having a hole formed therein and at least partly receiving said third body portion, said body means being rigidly bonded to said handle portion, said handle portion also including a slot formed therein snugly receiving said tongue portion for resisting relative movement between said body means and said handle portion.

21. Detachable handle apparatus comprising a body means, said body means including a clamping portion for engaging a member to be clamped, said body means also including guide means, elongated clamping means including spaced portions mounted within said guide means for guiding movement of said clamping means toward and away from said clamping portion of the body means, said clamping means having cam means thereon, actuating means including cam means for engaging the cam means on said clamping means, means normally resiliently biasing said actuting means toward said clamping means and into clamping position, said actuating means including detent mechanism interconnected therewith for holding the actuating means in a released position, said guide means providing a clearance with the associated spaced portions of the clamping means to permit pivotal movement of said clamping means with respect to said guide means and the body means, said guide means including a pair of spaced slots, said clamping means having a non-circular cross sectional configuration and being both slidably and pivotally mounted within the associated slots.

22. Detachable handle apparatus comprising a body means, said body means including a clamping portion for engaging a member to be clamped, said body means also including guide means, elongated clamping means including spaced portions mounted within said guide means for guiding movement of said clamping means toward and away from said clamping portion of the body means, said clamping means having cam means thereon, actuating means including cam means for engaging the cam means on said clamping means, means normally resiliently biasing said actuating means toward said clamping means and into clamping position, said actuating means including detent mechanism interconnected therewith for holding the actuating means in a released position, said guide means providing a clearance with the associated spaced portions of the clamping means to permit pivotal movement of said clamping means with respect to said guide means and the body means, said clamping means having a tapered hole formed therein, the outer end of said actuating means including a tapered end for engaging the tapered hole in the clamping means to cam the clamping means into clamping position.

23. Apparatus as defined in claim 22 wherein the outer end portion of said actuating means includes a first sloping portion at the terminal end thereof, and a second sloping portion joining with said first sloping portion and spaced from the terminal end of the actuating means, and the second sloping surface of the actuating means defining a substantially different angle with respect to the longitudinal axis of the actuating means than the said first sloping surface.

24. Detachable handle apparatus comprising body means, said body means including first, second and third portions, said portions being rigidly interconnected with one another, said first portion defining a clamping portion for engaging a container to be clamped and also defining a pair of spaced side walls the forward edges of which are adapted to engage the surface of a container to be clamped, said second portion including guide means, elongated clamping means having spaced portions thereof engageable with said guide means for guiding movement of the clamping means, said third portion of the body means being elongated and hollow, actuating means extending within said third portion and being movably supported for engaging said clamping means to move it into clamping relationship with respect to said clamping portion, an elongated handle portion, said handle portion having a hole therein receiving at least part of said third portion of the body means, said body means being fixedly secured to said handle portion, means normally biasing said actuating means towards its clamping position in engagement with said clamping means, and detent mechanism for holding said actuating means in a release position to allow the clamping means to move to an unclamped position, said detent mechanism including a manually engageable means pivotally interconnected with said actuating means, said third body portion having a slot formed therein for receiving part of said manually engageable means for holding the manually engageable means in a release position.

References Cited by the Examiner
UNITED STATES PATENTS

| | | | |
|---|---|---|---|
| 1,268,089 | 6/1918 | Borsse | 16—114 |
| 3,065,018 | 11/1962 | Serio | 294—31 |
| 3,157,909 | 11/1964 | Schmitt | 294—31 X |
| 3,186,026 | 6/1965 | Serio | 294—31 X |

GERALD M. FORLENZA, *Primary Examiner.*

G. F. ABRAHAM, *Assistant Examiner.*